United States Patent [19]
Okutani et al.

[11] Patent Number: 5,393,201
[45] Date of Patent: Feb. 28, 1995

[54] SYNCHRONOUS ROTATING APPARATUS FOR ROTATING A PLURALITY OF SHAFTS

[75] Inventors: Norio Okutani, Neyagawa; Teruo Maruyama, Hirakata, both of Japan

[73] Assignee: Matsushita Electric Industrial Co., Ltd., Osaka, Japan

[21] Appl. No.: 11,901

[22] Filed: Feb. 1, 1993

[30] Foreign Application Priority Data

Jan. 31, 1992 [JP] Japan .................. 4-016045

[51] Int. Cl.⁶ ................. F04D 19/04; F04B 49/06
[52] U.S. Cl. ...................... 417/16; 417/17;
417/42; 417/423.4; 417/44.9; 250/231.15;
318/85
[58] Field of Search .............. 417/16, 17, 42, 44 R,
417/44 J, 203, 423.4, 216; 250/231.15, 231.16;
418/2; 318/73, 74, 76, 85

[56] References Cited

U.S. PATENT DOCUMENTS

| | | | |
|---|---|---|---|
| 3,311,803 | 3/1967 | Schulz ................. | 318/85 |
| 3,636,364 | 1/1972 | Stempler et al. ........ | 318/85 |
| 3,764,868 | 10/1973 | O'Callaghan ........... | 318/85 |
| 3,906,313 | 9/1975 | Danis ................... | 318/85 |
| 4,971,442 | 11/1990 | Okutani et al. ......... | 250/231.16 |
| 4,978,848 | 12/1990 | Hiwatashi et al. ...... | 250/231.16 |
| 5,073,710 | 12/1991 | Takagi et al. .......... | 250/231.16 |
| 5,153,437 | 10/1992 | Nishii et al. .......... | 250/231.16 |
| 5,197,861 | 3/1993 | Maruyama et al. ....... | 417/42 |

FOREIGN PATENT DOCUMENTS

| | | | |
|---|---|---|---|
| 221003 | 9/1986 | European Pat. Off. . | |
| 2585523 | 1/1987 | France .................. | 318/74 |
| 134322 | 2/1979 | Germany ................ | 318/85 |
| 61-203688 | 9/1986 | Japan . | |
| 1-200084 | 8/1989 | Japan .................. | 418/2 |
| 1200083 | 8/1989 | Japan . | |
| 2290187 | 11/1990 | Japan . | |
| 2301685 | 12/1990 | Japan . | |
| 3043689 | 2/1991 | Japan .................. | 417/17 |

*Primary Examiner*—Richard A. Bertsch
*Assistant Examiner*—Roland G. McAndrews, Jr.
*Attorney, Agent, or Firm*—Wenderoth, Lind & Ponack

[57] ABSTRACT

A synchronous rotating apparatus synchronously rotates a plurality of rotary shafts independently driven by corresponding driving devices. The apparatus includes: a mechanical regulating member, arranged on the shafts, for maintaining relative rotating positions of the shafts at a predetermined angular difference; a rotation velocity and phase-detecting member, arranged on each shaft, for detecting rotation velocities of the shafts and phases within a regulated angular difference of the regulating member, and a driving control device for controlling the driving devices of the shafts so as to synchronously rotate the shafts based on a phase difference detected by the detecting member. The apparatus is applied to a fluid rotary apparatus.

10 Claims, 9 Drawing Sheets

SYNCHRONOUS ROTATING APPARATUS FOR ROTATING A PLURALITY OF SHAFTS

BACKGROUND OF THE INVENTION

The present invention generally relates to a synchronous rotating apparatus for rotating a plurality of shafts, and more particularly to an apparatus for correctly synchronously rotating a plurality of shafts rotated at high speeds, for example, when applied to a positive displacement vacuum pump used in the manufacturing of semiconductors.

Taking a vacuum pump as an example of an application of the present invention, the drawbacks inherent in a conventional vacuum pump will be discussed hereinbelow.

A vacuum pump is necessary to produce a vacuum environment for a CVD device, a dry etching device, a sputtering device, an evaporation device, etc. in the manufacturing of semiconductors. Moreover, a strict standard is set with respect to the vacuum pump since the manufactoring of semiconductors is starting to require a cleaner and higher vacuum.

In the semiconductor plant, generally, a vacuum discharge system is constructed of a roughing pump (positive displacement vacuum pump) and a high vacuum pump (turbo molecular pump) to obtain a high vacuum. After a certain degree of vacuum pressure is attained from the atmospheric pressure by the roughing pump, the pump is switched to a high vacuum pump so as to thereby reach a predetermined high level of vacuum pressure.

Figure 7:
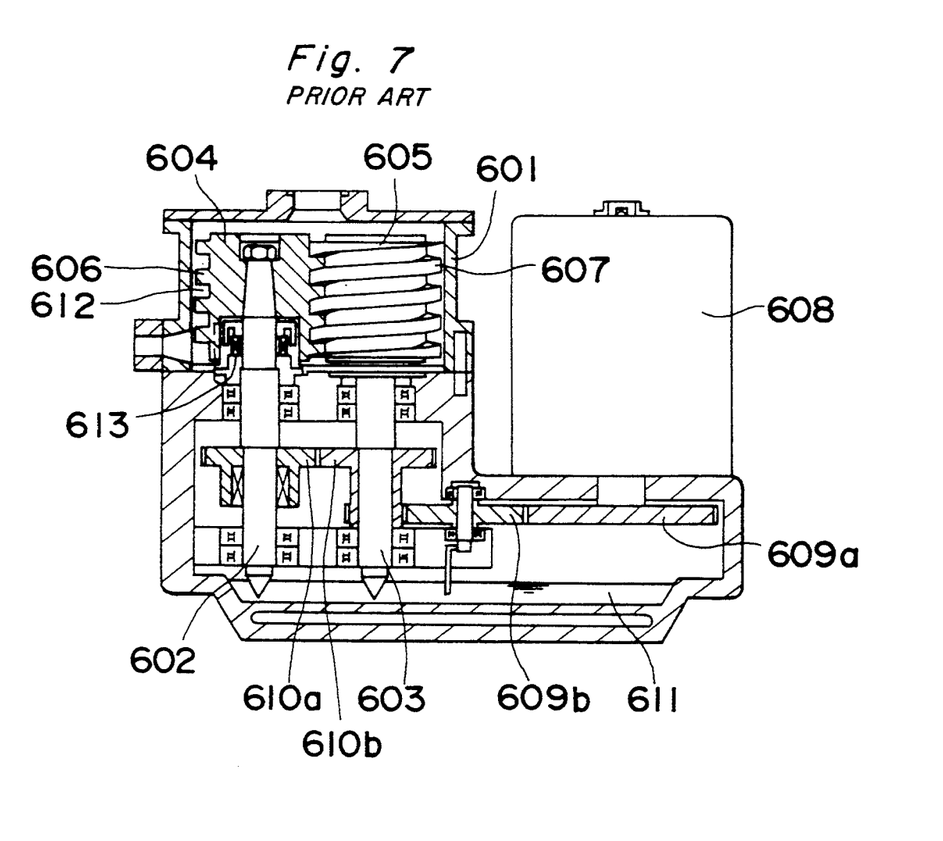
FIG. 7 is a sectional view of a conventional roughing pump.

FIG. 7 shows one screw-type vacuum pump which is a kind of conventional positive displacement vacuum pump (roughing pump), in which element 601 is a housing; element 602 is a first rotary shaft; element 603 is a second rotary shaft; elements 604 and 605 are cylindrical rotors supported by the respective rotary shafts 602 and 603; and elements 606 and 607 are grooves threaded in the outer peripheries of the respective rotors 604 and 605. In the conventional screw type vacuum pump, the first rotary shaft 602 and the second rotary shaft 603 are arranged so as to be parallel to each other within the housing 601, having rotors 604 and 605 thereon. The rotors 604 and 605 are provided with threaded grooves 606 and 607, respectively. When the recessed part (groove) of one rotor 606 or 607 is meshed with the projecting part (land) of the other rotor 607 or 606, a space is defined therebetween. As both rotors 604 and 605 are rotated, the volume of the space is changed so as to thereby suck and discharge air.

Figure 8:
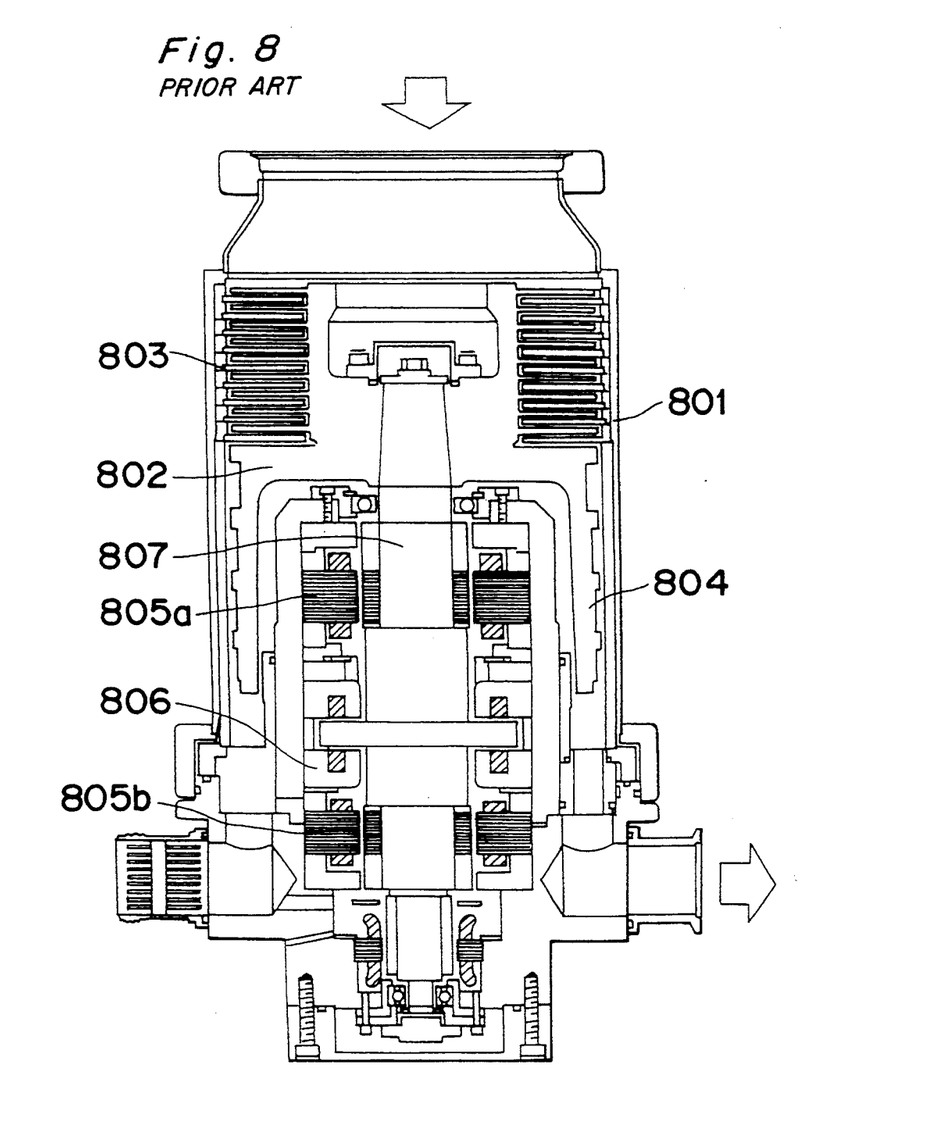
FIG. 8 is a sectional view of a conventional high vacuum pump.

FIG. 8 illustrates one kind of conventional kinetic type vacuum pump (high vacuum pump), i.e., a vacuum pump of a screw groove type having a turbine blade. In the drawing element 801 is a housing; element 802 is a cylindrical rotor; element 803 is a turbine blade; element 804 is a screw groove; elements 805a and 805b are magnetic radial bearings which support a rotary shaft 807; and element 806 is a magnetic thrust bearing. The conventional vacuum pump with a turbine blade as shown in FIG. 8 has the rotor 802 inside the housing 801, and the turbine blade 803 and the screw groove 804 formed in the lateral upper and lower parts of the rotor 802. Each of the turbine blade 803 and the screw groove 804 impresses momentum to gas molecules, to execute sucking and discharging.

The conventional vacuum pumps and the vacuum discharge system in the combination of the conventional vacuum pumps described hereinabove specifically have the following drawbacks:

(a) Drawbacks of Roughing Pump (Positive Displacement Vacuum Pump)

The synchronous rotation of the two rotors 604 and 605 is achieved by timing gears 610a and 610b in the screw type vacuum pump of FIG. 7. That is, the rotation of a motor 608 is transmitted from a driving gear 609a to intermediate gear 609b further to one timing gear 610b of the rotor 605 which is meshed with a timing gear 610a of the rotor 604. The phase of the rotating angle of each rotor 604 and 605 is adjusted through the engagement of the timing gears 610a and 610b. Since the vacuum pump of this kind uses gears for the purpose of transmission of power from the motor and synchronous rotation of rotors, it is so designed that a lubricating oil 611 contained within a mechanical operating chamber where the gears are accommodated is supplied to the gears. At the same time, a mechanical seal 613 is provided between the mechanical operating chamber 611 and a fluid operating chamber 612 so as to prevent the lubricating oil from entering the chamber 612 where the rotors are housed.

In the above-described structure of the screw vacuum pump with two rotors, (1) many gears are needed for and transmission of power and synchronous rotation of the rotors, that is, a large number of components are used so as to thereby complicate the apparatus; (2) since the rotors are synchronously driven in a contacting manner using gears, the apparatus is not able to operate at high speeds and becomes bulky; (3) due to the abrasion, the mechanical seal must be regularly exchanged and the apparatus is not completely maintenance-free; and (4) the large sliding torque as a result of the mechanical seal brings about a great mechanical loss.

(b) Drawbacks of High Vacuum Pump (Kinetic Type Turbo Molecular Pump)

Similar to the roughing pump as depicted hereinabove, the turbo molecular pump is so constituted as to meet the requirement that the manufacturing environment of semiconductors should be clean. For instance, in the turbo molecular pump of a screw groove type having a turbine blade as shown in FIG. 8, magnetic bearings 805a, 805b, and 806 are employed in place of ball bearings which use oil lubrication. Therefore, the space where the bearings are accommodated is a vacuum in the turbo molecular pump. Although it is generally difficult to lubricate during the mechanical sliding motion a vacuum, the above use of magnetic bearings becomes a solution to this. Moreover, since an oil reservoir in the structure using ball bearings is not necessitated, the apparatus can be connected to a vacuum chamber in any position. Nevertheless, each shaft must be provided with an electromagnet, a sensor, and a controller, which disadvantageously results in a significant cost rise in comparison with the structure using ball bearings.

(c) Drawbacks of Vacuum Discharge System (a+b)

The conventional roughing pump (positive displacement vacuum pump) discharges air in the area of a viscous flow close to atmospheric pressure, and can only obtain a vacuum which is as low as about $10^{-1}$ Pa. On the other hand, the conventional high vacuum pump (turbo molecular pump) is workable up to approximately $10^{-8}$ Pa or so, but is unable to discharge in the area of a viscous flow close to atmospheric pressure. As such, in the conventional arrangement, the roughing pump (e.g., the earlier-mentioned screw pump) is first used to draw a vacuum approximately to $10^0$-$10^{-1}$ Pa, and subsequently the high vacuum pump (kinetic type turbo molecular pump) is used to attain a predetermined high vacuum.

In the meantime, with the recent complication in the manufacturing of semiconductors, a plurality of vacuum chambers have been independently driven, that is, a multi-chamber system has been a main stream for the manufacturing facilities. However, the above multi-chamber system requires a vacuum discharge system composed of a roughing pump and a high vacuum pump for every chamber, thus causing the system to be large-scale and complicated as a whole.

In order to solve the above (a), one of the inventors of the present invention has already proposed a positive displacement vacuum pump of a combination of a plurality of rotors in U.S. patent and application Ser. No. 738,902, wherein each shaft of the rotors is driven by an independent motor, and the rotors are synchronously rotated in a contactless manner. Accordingly, the vacuum pump is oil-free and miniaturized.

Further, in order to solve the above (b) and (c), the inventor has proposed a wide broad-band vacuum pump in the U.S. patent application Ser. No. 738,902 which is a composite pump having a kinetic type vacuum pump formed concentrically with one rotor of a positive displacement pump, thereby making it possible to draw from atmospheric pressure to a high vacuum by a single pump.

In the above-proposed arrangement, an incremental encoder is provided for each of a plurality of rotary shafts. A reference pulse is fed from the same pulse generator to each control circuit which controls the driving motor driving the corresponding rotary shaft so as to synchronously rotate the plurality of rotary shafts. Accordingly, the rotating speed and rotating phase of the driving motor, i.e., rotary shaft are controlled by the respective control circuit in accordance with the reference pulse.

Although the above proposal makes it possible to rotate a plurality of rotary shafts by the approximately same rotating frequency or rotating speed, it is difficult to correctly synchronize a plurality of rotary shafts within the absolute rotating angle (rotating position to the stationary coordinates).

A pair of rotors should be correctly rotated without contact each other while a fixed backlash is kept therebetween in the positive displacement pump. Even when the rotors are assembled and mounted correctly in position in accordance with signals from the respective incremental encoders, the rotors may shift during operation, partly because of the internal noise generated in the vacuum pump. For example, when the motors are started or stopped, a driving current of motors is suddenly changed, which causes an instantaneous increase in the switching noise. The other reason for the above shift is that an electromagnetic noise is generated from a plasma source when a vacuum pump is installed in the dry etching plant or a sputtering plant. These noises are superimposed on minute signals read from the encoders, thus inviting erroneous counting of the number of pulses indicative of the positional information of the motors. In the case where the incremental encoders have counting errors, the relative position of the two shafts is displaced and cannot be restored.

If an absolute encoder which can correctly detect the phase of a rotary shaft is employed, the phase shift of a plurality of rotary shafts can be detected through comparison, and the synchronization is achieved based the detection. However, many detecting slits must be provided in a rotating plate of the absolute encoder so as to correctly detect the absolute phase of the rotary shaft within 360°, and therefore, the outer diameter of the rotating plate is increased and the encoder eventually becomes scale. If the outer diameter of the rotating plate is increased, the rotating plate is easy to break or deform due to the centrifugal force when rotated at high speeds. As such, the synchronous method using the absolute encoder is often found to be difficult to be employed to correctly synchronize rotary shafts rotated at high speeds as in the vacuum pump described hereinabove.

SUMMARY OF THE INVENTION

An object of the present invention is to provide an apparatus for synchronously rotating a plurality of rotary shafts, which can correctly control not only the relative angle of each rotary shaft, but the phase (absolute position to the stationary coordinates) thereof and is applicable to high-speed rotation.

In accomplishing these and other objects, according to a first aspect of the present invention, a synchronous rotating apparatus is provided for synchronously rotating a plurality of rotary shafts independently driven by corresponding driving devices, comprising: a mechanical regulating member, arranged on the plurality of rotary shafts, for maintaining relative rotating positions of the plurality of rotary shafts at a predetermined angular difference; a rotation velocity and phase-detecting member, arranged on each rotary shaft, for detecting rotation velocities of the rotary shafts and phases within a regulated angular difference of the mechanical regulating member; and a driving control device for controlling the driving devices of the rotary shafts to synchronously rotate the rotary shafts based on a phase difference detected by the rotation velocity and phase-detecting member.

According to a second aspect of the present invention, a synchronous rotating apparatus is provided which is applicable to a fluid rotary apparatus, the fluid rotary apparatus comprising: a plurality of rotors accommodated in a housing to synchronously rotate them; bearings for supporting rotation of the rotors; fluid suction and discharge ports formed in the housing; and motors for rotating and driving the plurality of rotors independently;

the synchronous rotating apparatus comprising: a mechanical regulating member, coaxially arranged on the rotors, for maintaining relative rotating positions of the rotors in a predetermined angular difference; a rotation velocity and phase-detecting member, arranged on each rotor, for detecting rotation velocities of the rotors and phases within a regulated angular difference of the mechanical regulating member; and a driving control device for controlling the motors of the rotors to synchronously rotate the rotors based on a phase difference detected by the rotation velocity and phase-detecting member, whereby the fluid is sucked and discharged by utilizing a change of a volume of a space defined by the rotors and the housing through the synchronous control of the rotation of the motors by the driving control device.

According to a third aspect of the present invention, a synchronous rotating apparatus is provided in which the mechanical regulating member is made of gears to prevent direct mechanical contact of the rotors.

According to a fourth aspect of the present invention, a synchronous rotating apparatus is provided in which the rotation velocity and phase-detecting member having two sides and comprises: a rotating plate member having detecting slits in such a predetermined pattern that a pitch between the adjacent slits is equal to the regulated angular difference of the mechanical regulating member; a light source located on one side of the rotating plate member and projecting a light towards the rotating plate member; a fixed slit plate member arranged on the other side of the rotating plate member and having a slit; and a light detecting member for detecting the rotation velocities of the rotors and the phases within the regulated angular difference of the mechanical regulating member by receiving the light passed through both the detecting slit of the rotating plate member and the slit of the fixed slit plate member, and then outputting a signal to the driving control device.

According to the construction, in the apparatus of the present invention, the mechanical regulating means/member is provided between rotary shafts or rotors, which may be comprised of gears or the like meshed with each other with a constant backlash to maintain the relative rotating position of a plurality of the rotary shafts within the predetermined angular difference, so that the rotary shafts or rotors are prevented from being shifted by an amount not smaller than the angular difference.

If encoders are used as the rotation velocity and phase-detecting member to detect the phase shift of the rotary shafts or rotors only in the angular difference restricted by the mechanical regulating means, the rotating plate of the encoder never becomes large, the reason for which will be depicted hereinbelow.

The detecting slits formed in the rotating plate member of the encoder are able to detect only one-bit data on a circumference, i.e, whether the light permeates or not. Therefore, when the absolute position is to be detected, for example, with 1° accuracy within 360°, it is necessary to distinguish the positional data from 0 to 360 and to detect data of at least an amount not smaller than nine bits. In this case, the detecting slits should be formed nine times or more around the circumference. With the width of the detecting slit and the interval between the inner and outer peripheries thereof taken into consideration, the outer diameter of the rotating plate member becomes considerably large. Moreover, a light source or a light detecting member is necessary for every bit, resulting in a more complicated structure of the encoder.

On the contrary, data of significantly fewer bits is enough if the phase is to be detected is the regulated angular difference defined by the mechanical regulating means. For example, if the phase is to be detected with 1° accuracy when the regulated angular difference is 5°, three-bit positional data is enough and therefore the detecting slits must be formed only three times around the circumference of the rotating plate member. Moreover, if the rotating plate member and the fixed slit plate member are devised in structure as in an embodiment described later, one round of detecting slits is satisfactory. Consequently, the rotating plate member of the encoder can be made small, and the number of components is reduced.

When the mechanical regulating means is combined with the encoder, in the case of merely a slight deviation in the synchronization of the rotary shafts, the rotary shafts can be adjusted based on the shift of the phase detected by the encoder, and the mechanical regulating means is not necessary to work. Any drawback resulting from the collision of gears is never brought about.

If the synchronization of the rotary shafts is suddenly and greatly shifted because of a large load change or the like, it may happen that the rotary shafts cannot be adjusted in time on the basis of the data of the encoder. In this case, however, the mechanical regulating means starts to work, and the synchronous rotation is accordingly never broken over the regulated angle. Moreover, the phase of the rotary shafts is never shifted at all outside the detecting range of the encoder owing to the mechanical regulating means.

BRIEF DESCRIPTION OF THE DRAWINGS

These and other objects and features of the present invention will become clear from the following description taken in conjunction with the preferred embodiments thereof with reference to the accompanying drawings, in which:

FIGS. 10A–13 are schematic descriptive views showing modifications of rotors to be used in the present invention.

DETAILED DESCRIPTION OF THE PREFERRED EMBODIMENT

Before the description of the present invention proceeds, it is to be noted that like parts are designated by like reference numerals throughout the accompanying drawings.

I). Synchronous rotating method of a plurality of shafts

II). Applied example of the present invention to a fluid rotating apparatus

In the first place, the above I) will now be described below.

Figure 4:
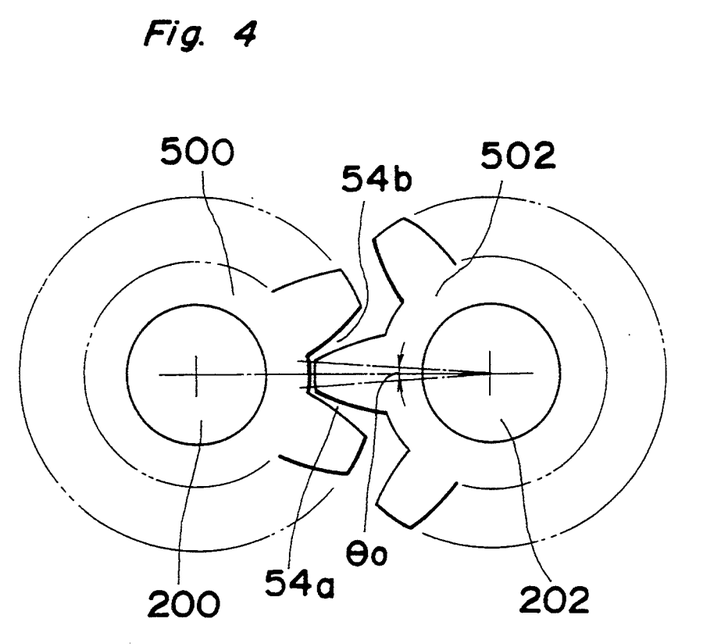
FIG. 4 is a structural plan view of a mechanical regulating means.

FIG. 4 illustrates the structure of a mechanical regulating means in a synchronous rotating apparatus according to one preferred embodiment of the present invention.

Regulating gears 500 and 502 meshed with each other are mounted to a pair of rotary shafts 200 and 202. Constant gaps, namely, backlashes 54a and 54b are set between the teeth of the regulating gears 500 and 502. Therefore, when the regulating gear 502 is rotated right and left while the regulating gear 500 is fixed, the regulating gear 502 can be freely rotated by a constant angle $\theta_0$ before the teeth of the gears 500 and 502 come into touch with each other. In other words, if the phase is shifted by an amount not smaller than the relative angle $\theta_0$ at maximum when the rotary shafts 200 and 202 are driven independently, the teeth of the regulating gears 500 and 502 are brought in contact with each other. In consequence, the phase shift of the rotary shafts 200 and 202 is restricted reliably to be not larger than the above angle $\theta_0$.

Figure 2:
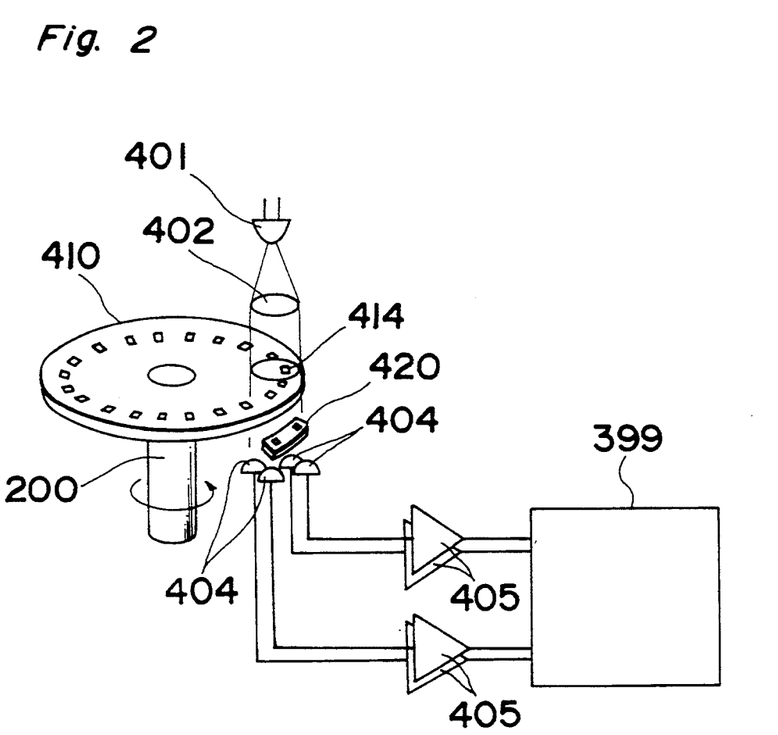
FIG. 2 is a schematic view showing the basic structure of the encoder.

FIG. 2 shows the basic structure of an encoder mounted to the rotary shaft.

The rotary shaft 200 which corresponds to each rotary shaft 20 and 22 of a vacuum pump (FIG. 6) to be described later and having the above-described regulating gears 500 and 502 is provided with a rotating plate 410. The rotating plate 410 has detecting slits 414, etc. in a predetermined pattern. A light source 401 and a collimator lens 402 are located above the rotating plate 410. Below the rotating plate 410 are arranged a fixed slit plate 420 having a pair of slits 422 and 424, a photodetector 404, and a waveform shaping circuit 405. Transparent areas made of transparent material may be formed in the rotating plate 410 and the fixed slit plate 420, instead of the slits 414, 422 and 424.

When the light projected from the light source 401 passes through both the detecting slit of the rotating plate 410 and the slit of the fixed slit plate 420, it is detected by the photodetector 404 and fed to the waveform shaping circuit 405. As a result, a detecting signal is output from the waveform shaping circuit 405.

Figure 3:
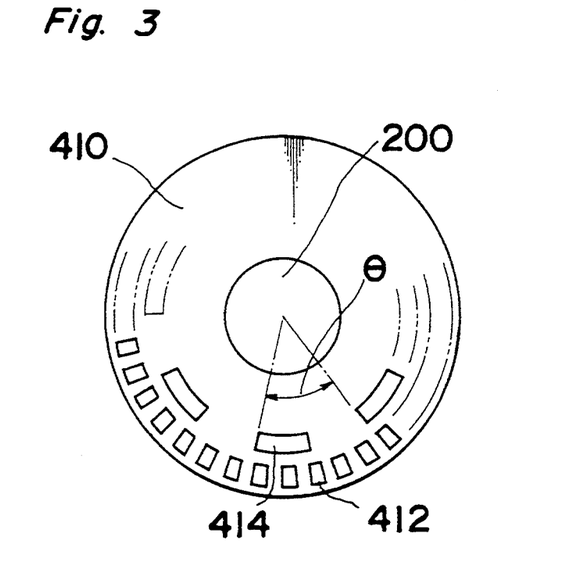
FIG. 3 is a structural plan view of slits of a rotating plate.

FIG. 3 indicates the pattern of the slits formed in the rotating plate 410.

Relatively narrow slits 412 are formed and spaced with an equal distance in the whole periphery of the rotating plate 410. Incremental data is detected by the slits 412. That is, every time the slit 412 passes the detecting position as the rotating plate 410 is rotated, a pulse signal is output. The rotating angle from a reference position can be detected by counting the number of pulses from the reference position. Moreover, the rotating speed can be known by detecting the number of pulses within a set time. As the length and the interval of the slits 412 are set smaller, the detecting accuracy of rotation is enhanced, i.e., an encoder with high resolving power is obtained. The detection by the slits 412 is conducted in the same manner as by a general incremental encoder and the detailed description will be abbreviated here.

Partial phase detecting slits 414 are formed inside the slits 412. The slits 414 are provided every constant angle $\theta$ with an equal distance in the whole periphery of the rotating plate 410. The angle $\theta$ is set equal to or larger than the above regulated angular difference $\theta_0$ of the regulating means. Moreover, the length of each slit 414 in the circumferential direction is $\frac{1}{2}$ the angle $\theta$. Additionally, if the above regulated angular difference $\theta_0$ is very small, only one slit 422 or 424 may be formed in the fixed slit plate 420.

Figure 1:
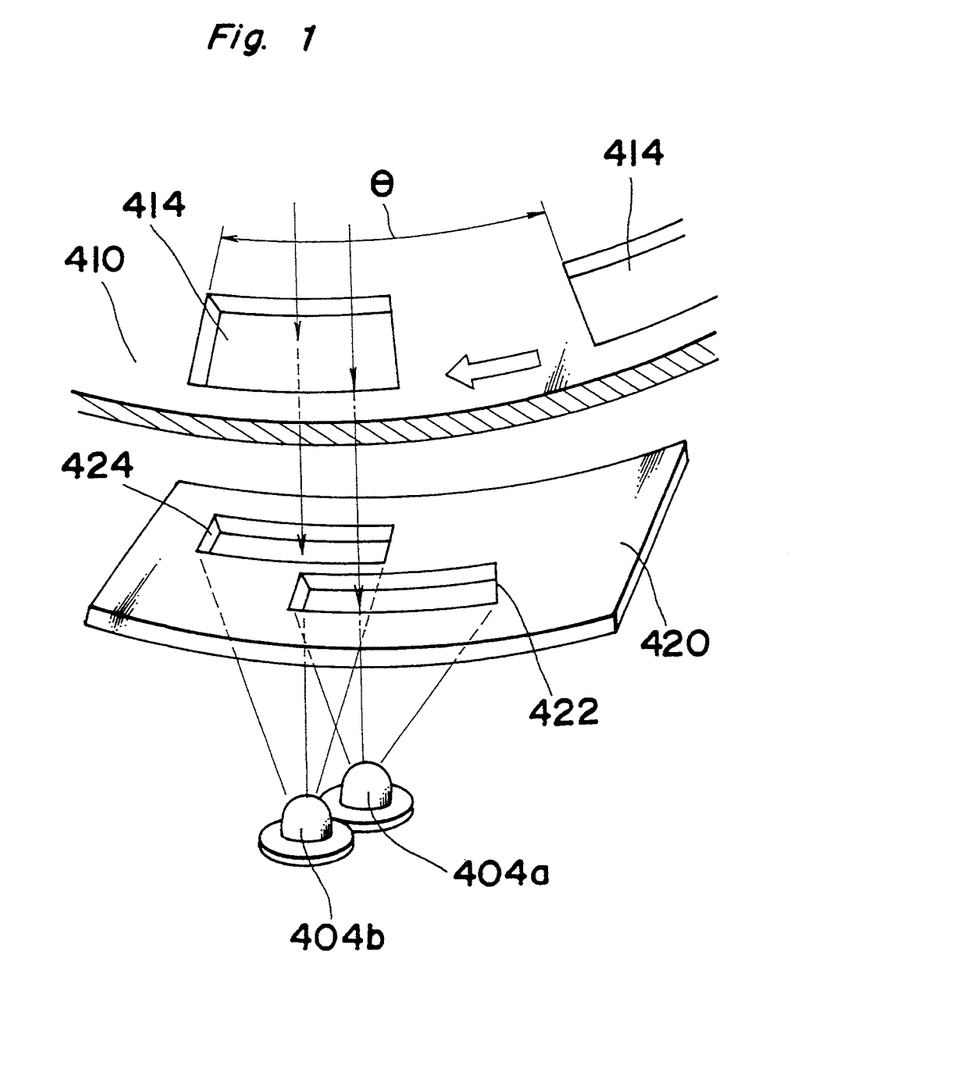
FIG. 1 is a perspective view indicating the partial structure of a partial phase detecting means of an encoder in a synchronous rotating apparatus according to an embodiment of the present invention.

FIG. 1 shows the detailed structure in the vicinity of the partial phase detecting slits 414, along with the detecting operation thereof.

The pair of slits 422 and 424 are disposed so as to be slightly displaced the circumferential direction from one another in the fixed slit plate 420 below the slits 414. The sum of the widths of the slits 422 and 424 in the diametrical direction of the slit plate 420 is the same as the width of the slit 414. The length of each slit 422 and 424 in the circumferential direction is the same as that of the slit 414 of the rotating slit 410. The slits 422 and 424 are displaced $\frac{1}{2}$ the total length thereof in the circumferential direction. Photodetectors 404a and 404b provided below the corresponding slits 422 and 424.

Figure 5:
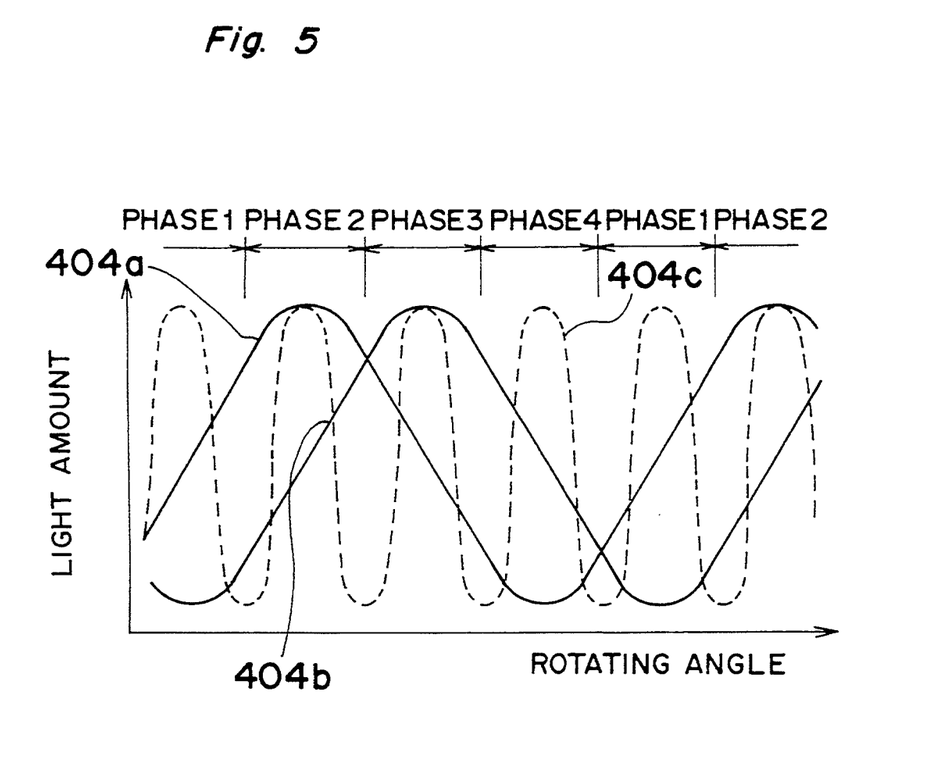
FIG. 5 is a diagram explanatory of the relationship of partial phases.

Supposing that the rotating plate 410 is rotated in a direction of the white arrow, when a part of the rotating plate 410 without the slits 414 passes over the slit 422 of the fixed slit plate 420, the photodetector 404b does not detect the light [phase 1 in FIG. 5]. When the rotating plate 410 is further rotated and the slits 414 are moved, one slit 414 comes above the slit 422 of the fixed slit plate 420, the detecting amount of light of the photodetector 404a becomes maximum [phase 2 in FIG. 5]. Subsequently, when the slit 414 of the rotating plate 410 comes above the slit 424 of the fixed slit plate 420, the photodetector 404b shows the maximum detecting amount of light [phase 3 in FIG. 5]. Then, as the slit 414 of the rotating plate 410 is moved away from above the slit 422 of the fixed slit plate 420 to reach immediately above the slit 424, only the photodetector 404b detects the light and the photodetector 404a does not detect light [phase 4 in FIG. 5]. It is returned to the above phase 1 if the rotating plate 410 is further rotated.

As described hereinabove, the detection of light by a pair of the photodetectors 404a and 404b is distinguished into four kinds of phases 1–4 within the angle $\theta$. Therefore, if an absolute address is assigned to every area defined when the angle $\theta$ is divided into four, it becomes possible to distinguish the area, whereby the absolute position of the phase within the angle $\theta$ can be detected.

A method for synchronization of a plurality of shafts using the above synchronous rotating apparatus will be described hereinbelow.

As shown in FIG. 4, while the regulating gears 500 and 502 of the rotary shafts 200 and 202 are meshed with each other, their phases are detected by the partial phase detecting means of the encoder mounted to each rotary shaft 200 and 202 in which of the phases 1–4 each rotary shaft 200 and 202 is present. For instance, it is detected that the rotary shaft 200 is in the phase 1, while the rotary shaft 202 is in the phase 3.

When the rotary shafts 200 and 202 are rotated, the partial phase detecting means of the encoder instantaneously detects in which of the four phases each rotary shaft 200 and 202 is located. If the phase of each rotary shaft 200 and 202 is the same as in the initial state before rotation, or if the phase difference is the same, it is confirmed that the rotary shafts 200 and 202 are correctly synchronously rotated as in the initial state. More specifically, supposing that the rotary shaft 200 is in the phase 1 and the rotary shaft 202 is in the phase 3 in the initial state, if the rotary shafts 200 and 202 assume respectively phases 1 and 3, or 2 and 4, or 3 and 1 in the rotating state, i.e., if the phase difference of the rotary shafts is the same in the rotating state as in the initial state, both rotary shafts 200 and 202 are synchronized. If the phases of the rotary shafts detected by the partial phase detecting means are found to be shifted from that in the synchronous state, one of the rotary shafts 200 and 202 is adapted to be advanced or delayed relatively to the other rotary shaft so as to recover the synchronous state. The rotary shafts 200 and 202 can be thus synchronized at all times. The electronic circuit shown in FIG. 9 is used to obtain the partial phase information from the encoders, to compare the phase information of a plurality of rotary shafts, and to control the rotation of the rotary shafts.

Figure 9:
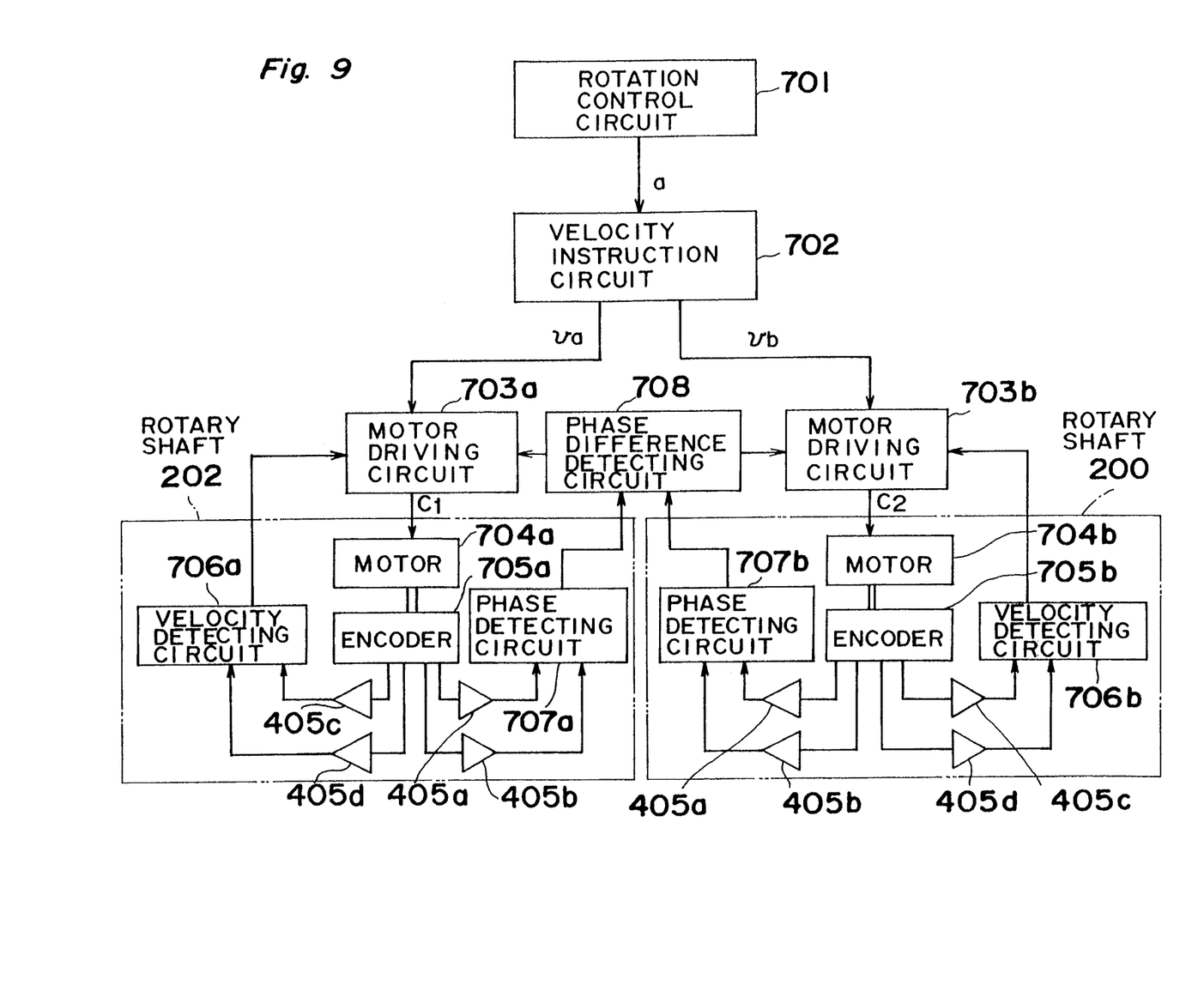
FIG. 9 is a diagram showing a driving control circuit applicable to the embodiment.

FIG. 9 is a block diagram of a driving control circuit 399 as the electronic circuit device. In FIG. 9, a rotation control signal (a) outputted from a rotation control circuit 701 is inputted to a velocity instruction circuit 702. The velocity instruction circuit 702 outputs velocity instructions $v_a$ and $v_b$ to motor driving circuits 703a and 703b of the rotary shafts 200 and 202 based on the rotation control signal (a). The motor driving circuits 703a and 703b respectively output driving signals ($c_1$) and ($c_2$) to motors 704a and 704b (corresponding to the driving motors 30 and 32 described later) based on the velocity instructions $v_a$ and $v_b$, and thus, the motors 704a, 704b rotate. Signals outputted from the encoders 705a and 705b (corresponding to the encoders 40 and 42 described later) in accordance with the rotation of the motors 704a and 704b are inputted to velocity detecting circuits 706a and 706b through the waveform shaping circuits 405a and 405b to detect the rotation velocities $V_a$ and $V_b$. The rotation velocities $V_a$ and $V_b$ detected by the velocity detecting circuits 706a and 706b are fed back to the motor driving circuits 703a and 703b to compare the detecting velocity $V_a$ and $V_b$ with the velocity instructions $v_a$ and $v_b$. So, in order that the rotation velocities coincide with the velocity instructions. The motor driving signals $C_1$ and $C_2$ must be corrected. Signals outputted from the encoders 705a and 705b are inputted to phase detecting circuits 707a and 707b through the waveform shaping circuits 405c and 405d to detect partial phase values $\theta_a$ and $\theta_b$. The partial phase values $\theta_a$ and $\theta_b$ detected by the phase detecting circuits 707a and 707b are inputted to a phase difference detecting circuit 708 to calculate a phase difference between the rotary shafts 200 and 202. Based on the calculated phase difference, the phase difference detecting circuit 708 feeds back signals indicating phase advance or phase delay of the phase to the motor driving circuits 703a and 703b. Based on the feed-back signals, the motor driving circuits 703a and 703b correct the motor driving signals $C_1$ and $C_2$. By repeating the above operations, it is possible to synchronously rotate the rotary shafts 200 and 202.

Since it is enough to form slits 414 on only one round of the circumference of the rotating plate 410, and even if the incremental slits 412 are additionally provided to detect the rotating speed, etc., the slits may be provided only two times around the circumference. Therefore, in comparison with the conventional absolute encoder having slits formed on many rounds of the circumference, the rotating plate can have its outer diameter greatly reduced, and the slits can be formed more simply in the rotating plate. The encoder therefore becomes compact in structure as a whole.

Although the shift of the rotary shafts 200 and 202 is detected by means of the partial phase detecting means by dividing the regulating angular difference into four phases 1–4 in the foregoing embodiment, it can be so arranged to detect the shift during the rotation of the rotary shafts that the detection of light by the photodetectors 404a and 404b (shown by solid lines in FIG. 5) to the partial phase detecting slits 414 of the rotating plate 410 is combined with that of the photodetectors 404c and 404d to the detecting slits 412 for detecting the rotating speed or the like of the rotating plate 410.

This method is a utilization of the intensity change of light, namely, the fact that a plurality of pulses are generated when the light is detected by the photodetector 404c (shown by broken lines) to the slits 412 of the rotating plate 410 in one cycle of the phases 1–4, i.e., after the phase 1 appears before it appears again when the light is detected by the photodetector to the phase detecting slits 414 of the rotating plate 410. For example, supposing that there are four pulses generated at the detection of light by the photodetector 404c in one cycle of the phases 1–4 distinguished corresponding to the detection of light by the photodetectors to the partial phase detecting slits 414, if three pulses are counted by the photodetector 404c for the rotary shaft 200 after the rotary shaft 200 appears in the phase 1 before the rotary shaft 202 comes in the phase 2, the phase difference due to the shift of the rotary shafts 200 and 202 is found to be 3.

The partial phase detecting means is not limited to the above embodiment, and any arbitrary means is employable so long as it can detect the phase within a predetermined angle range. For instance, it is possible to simplify the slits of the rotating plate in the conventional absolute encoder in the whole circumference so much as to be able to detect the absolute position within a predetermined angle range. In such case as above, since it is enough to know the absolute position within a further narrower angle range than 360°, the detecting number of bits is reduced, and therefore the foregoing embodiment requires only several annular rows of slits.

According to the foregoing embodiment, the regulated angular difference is divided into four phases 1–4 by the partial phase detecting means. However, it is enough to detect the phase difference up to the degree to distinguish an area where the rotary shafts are synchronized from an area adjacent to the above area where the synchronization of the rotary shafts is shifted. Although the synchronizing accuracy of the rotating speed is enhanced as the phase detecting accuracy is increased, the encoder becomes complicated in structure. Therefore, the detecting accuracy of the partial phase detecting means should be set corresponding to the required performance.

If the above partial phase detecting means is incorporated in the encoder, it becomes possible to use conventional optical, magnetic or other kinds of encoders.

The rotary shafts to be synchronized are not limited to two as in the above embodiment, but may be three or more. In order to achieve synchronization of multi shafts, regulating gears should be provided between one driving shaft and the other driven shafts, and the partial phase information detected for the driving shaft is compared with that of the remaining driven shafts so as to, thereby control the driven shafts to be synchronously rotated with the driving shaft. Or, the second rotary shaft is synchronized with the first rotary shaft, and the third rotary shaft is synchronized with the second rotary shaft, and so on so as to, thereby sequentially synchronize many rotary shafts.

Figure 6:
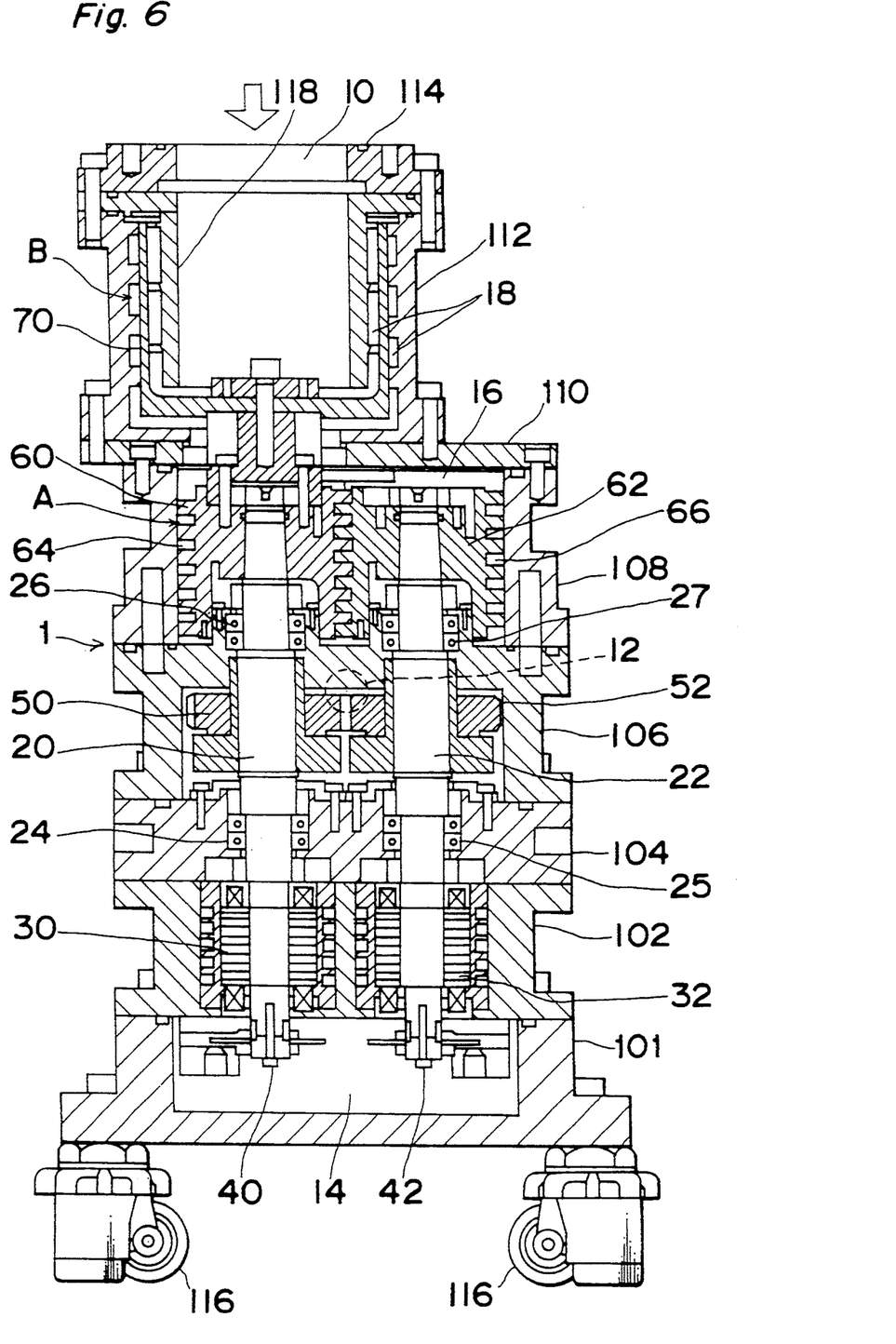
FIG. 6 is a structural sectional view of a vacuum pump in which the synchronous rotating apparatus of one embodiment of the present invention is incorporated.

Now, the applied example II, that is, a fluid rotating apparatus to which the synchronous rotating apparatus of the embodiment is applied will be described below. FIG. 6 shows the structure of a broad-band vacuum pump as one kind of a fluid rotating apparatus.

The vacuum pump includes a positive displacement pump structure section (A) and a kinetic pump structure section (B) in the lower and upper parts inside a housing 1. Fluid, namely, a gas is sucked by the upper kinetic pump structure section (B) through a suction port 10 formed in the housing 1, sent to the positive displacement pump structure section (A) and discharged from a discharge port 12 of the housing 1 (shown by a broken line in FIG. 6).

The structure of the positive displacement pump structure section (A) is described as follows. There are two driving shafts 20 and 22 arranged parallel to each other in the vertical direction. Driving motors (servo motors) 30 and 32 are mounted in the lower parts of the respective driving shafts 20 and 22. Moreover, rotation detecting encoders 40 and 42 are provided at the lower ends of the driving shafts 20 and 22 below the driving motors 30 and 32. The rotation detecting encoders 40 and 42 have the above-described partial phase detecting means incorporated therein. The rotation detecting encoders 40 and 42 are housed in an encoder storing chamber 14 in the housing 1. The driving shafts 20 and 22 are rotatably supported by bearings 24 and 25 affixed to the housing 1 above the driving motors 30 and 32. The driving shafts 20 and 22 are provided with contact preventing gears 50 and 52 above the bearings 24 and 25. These contact preventing gears 50 and 52 correspond to the regulating gears 500 and 502 forming the mechanical regulating means described earlier. The driving shafts 20 and 22 are rotatably supported also by bearings 26 and 27 affixed to the housing 1 above the contact preventing gears 50 and 52, and provided with rotors 60 and 62 above the bearings 26 and 27.

The rotors 60 and 62 are accommodated in a pump chamber 16 of the housing 1. The lower part of the pump chamber 16 communicates with the discharge port 12 (shown by the broken line in FIG. 6). As the rotors 60, 62 are rotated in the opposite directions while the screw grooves 64 and 66 in the outer peripheries of the rotors 60 and 62 are meshed with each other, the volume of the space defined between the inner wall of the pump chamber 16 and the rotors 60 and 62 is periodically changed, and consequently the gas is sucked from above the pump chamber 16 and fed downward. That is, a pumping action is performed. The structure of a positive displacement pump in a general fluid rotating apparatus is employed for the rotors 60 and 62 of the positive displacement pump structure section (A).

The contact preventing gears 50 and 52 are provided so as to prevent the rotors 60 and 62 from colliding in contact with each other. Specifically, the contact preventing gears 50 and 52 are disposed with a constant gap held between the tooth surfaces thereof. When the driving shafts 20 and 22 are synchronously rotated, the contact preventing gears 50 and 52 are never in touch with each other. However, if the synchronization of the driving shafts 20 and 22 is broken, the contact preventing gears 50 and 52 touch each other before the rotors 60 and 62 collide, so that the rotors 60 and 62 are prevented from being damaged subsequent to the collision. Accordingly, the synchronous rotation of the driving shafts 20 and 22 is not shifted over the gap (backlash) of the tooth surfaces of the contact preventing hears 50 and 52. For the above purpose, the backlash of the screw grooves 64 and 66 of the rotors 60 and 62 is set larger than that of the tooth surfaces of the contact preventing gears 50 and 52. If a solid lubricating film is formed in the tooth surfaces of the contact preventing gears 50 and 52, the friction of the tooth surfaces is reduced.

In the meantime, the two gears 50 and 52 can be set in any relative position within the range of the backlash. Since the present invention is applied so as to control the synchronization in a contactless manner according to the instant embodiment, the backlashes (54a and 54b in FIG. 4) in the right-and-left direction of the gears are set approximately equal to each other during the stationary rotation.

The rotation detecting encoders 40 and 42 detect the rotating speed and rotating position of the respective rotary shafts 20 and 22. In other words, the aforementioned incremental encoder or the partial phase detecting means is built into each rotation detecting encoder 40 and 42. Based on the data of the rotating speeds and rotating positions of the rotary shafts 20 and 22, the driving motors 30 and 32 are so controlled as to synchronize the rotary shafts 20 and 22. The structure of FIGS. 1–3 and a general rotation synchronizing method are employed respectively for the structure of the encoders 40 and 42 and the controlling method of the driving motors 30 and 32 based on the detecting information of the encoders 40 and 42, the description of which will be abbreviated. If the data is transmitted from the encoders 40 and 42 to the control device through an optical fiber, it is possible to prevent errors of the detecting information resulting from electrical noise and instability of the synchronous control.

It is necessary to prevent dust or other foreign substances from entering the encoder housing chamber 14 from outside in order to enhance the working reliability of the encoders 40 and 42. Therefore, it is effective to provide a magnetic fluid seal at portions where the driving shafts 20 and 22 penetrate the boundary between the encoder housing chamber 14 and the space above the chamber 14. Further, it is also effective to provide a gas purge means for impressing a predetermined pressure to the encoder housing chamber 14 using $N_2$ gas or the like. The magnetic fluid seal or gas purge means is disposed between the pump chamber 16 and the bearings 26 and 27 below the pump chamber 16 or the driving motors 30 and 32, thereby effectively preventing the invasion of a corrosive gas into the internal structure of the apparatus.

The kinetic pump structure section (B) above the positive displacement pump structure section (A) will be described hereinbelow.

The driving shaft 20 extends further above the pump chamber 16 of the positive displacement pump structure section (A). A cylindrical rotor 170 is mounted at the upper end of the driving shaft 20. The rotor 70 is accommodated between the inner wall of the housing 1 and an internal cylindrical diaphragm 118 integrally attached to the housing 1. Screw grooves formed in the inner wall of the housing 1 and the outer wall of the internal diaphragm 118 constitute a pump space 18 between the inner and outer surfaces of the rotor 70 and the inner wall of the housing 1 and the outer wall of the internal diaphragm 118. When the rotor 70 is rotated, fluid sucked through the suction port 10 is sent upward through the gap between the screw grooves of the internal diaphragm 118 and the rotor 70, and then fed downward through the gap between the rotor 70 and the screw grooves of the inner wall of the housing 1. In the structure described above, momentum is added to the gas molecules in touch with the rotor 70 by the rotation of the rotor 70, whereby the gas is discharged or pumped. Since the gas is moved and reciprocated at the inner and outer sides of the rotor 70, a large amount of momentum can be impressed to the gas for a long time, thereby increasing the pumping efficiency. The pump space 18 communicates with the pump chamber 16 of the positive displacement pump structure section (A), and therefore the gas discharged from the kinetic pump structure section (B) is supplied to the positive displacement pump structure section (A). References 101–108 represent housings accommodating the motors, the rotors and the like.

For the concrete structure of the kinetic pump structure section (B), the structure of a kinetic pump of a general fluid rotating apparatus may be utilized as well.

According to the embodiment, the fluid rotating apparatus is used not only in the integral combined structure of the positive displacement pump structure section (A) and the kinetic pump structure section (B), but as a roughing pump utilizing only the positive displacement pump structure section (A). Concretely, the rotor 70 of the kinetic pump structure section (B) is detached from the upper end of the driving shaft 20 and also the housing 106 is removed from above the housing 105 which forms the pump chamber 16 of the positive displacement pump structure section (A), and a lid having a suction port is provided. As a result, the fluid sucked from the suction port is discharged out of the discharge port 12 only by the positive displacement pump structure section (A).

If the synchronous rotating apparatus for a plurality of shafts of the present invention is installed in the vacuum pump as above, the high-speed rotation of the pair of rotors 60 and 62 in the positive displacement pump structure section (A) can be correctly and strictly synchronized as the function of the rotors 60 and 62 is maintained. Moreover, the contact preventing gears 50 and 52 are prevented from frequently colliding with each other.

It is also possible to rotate a plurality of shafts in the moderate control of synchronous rotation thereof not to permit abrasion and damage of the contact preventing gears 50 and 52 forming the mechanical regulating means while the contact preventing gears 50 and 52 are kept in soft touch with each other. In this case, each motor may be an induction motor. Since the motor does not have to be of the high response type as compared with a motor used for the purpose of contactless synchronous rotation, the output of the motor may be low. It is much more effective if the reaction force impressed to the gears is detected so as to thereby control the torque of the motors. Further, the rotors constituting the positive displacement pump structure section (A) (e.g., screws) may be utilized in place of gears as the mechanical regulating means.

A means for detecting the phase of each shaft with respect to the stationary coordinates may be obtained in a manner as follows if the inertial load is large and the rotating frequency change is small in the positive displacement pump. For example, a reference pulse is arranged to be generated when each rotor passes a predetermined position, and the phase of each shaft is detected based on the data of the rotating frequency from that point of generation of the reference pulse. In the method as above, the relative phases of shafts can be also operated from the phase of each shaft.

Figure 10A:
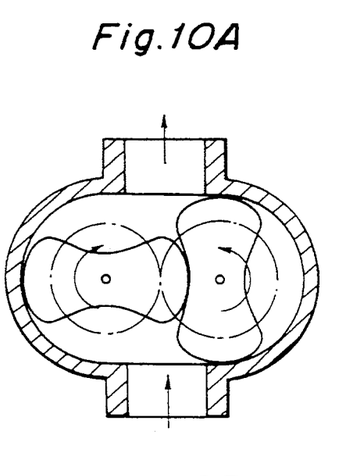
Figure 10B:
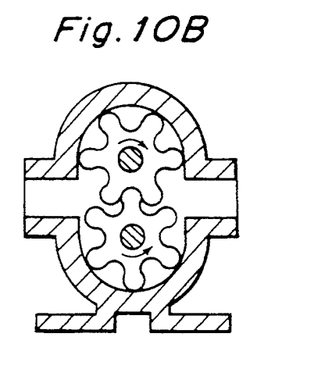
Figure 11A:
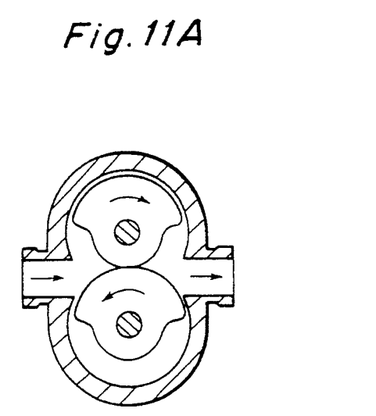
Figure 11B:
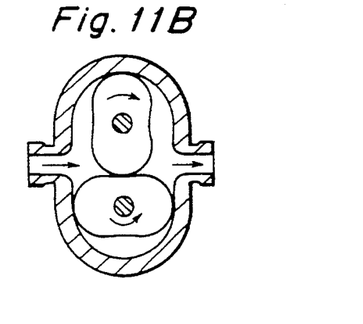
Figure 12:
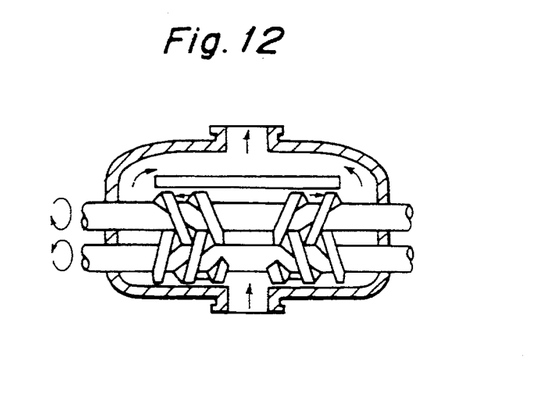
Figure 13:
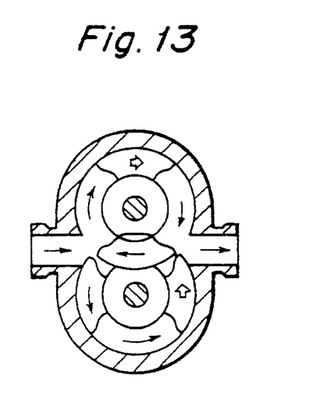

If the positive displacement pump structure section (A) is used alone, the fluid rotating apparatus of the present invention may serve as a compressor of an air conditioner, wherein the rotating parts (corresponding to the rotors 60, 62 in FIG. 5) may be of the Roots type as shown in FIG. 10A, the gear type as shown in FIG. 10B, the single lobe or double lobe type as shown in FIGS. 11A and 11B, respectively, the screw type as shown in FIG. 12, or the outer circumferential piston type as shown in FIG. 13, etc.

As described above, in the synchronous rotating apparatus of the present invention, since the mechanical regulating means and the partial phase detecting means are functionally combined, a plurality of shafts can be easily and correctly synchronized during the rotation, and the apparatus can be simplified and miniaturized. Especially, the present apparatus is applicable even when the rotary shafts are rotated at high speeds. At the same time, the reliability of the apparatus with electromagnetic noise in the synchronous control can be remarkably improved.

In the case where the present invention is applied to a fluid rotating apparatus, it ensures the following advantages because of its synchronous electronic control of rotation of a plurality of rotary shafts as achieved in the already proposed vacuum pump (U.S. patent application Ser. No. 738,902). That is, when the present invention is employed to control the synchronous rotation of a positive displacement vacuum pump in a contactless manner, timing gears used in the conventional screw pump which accompany mechanical sliding motion become unnecessary. Since each rotor can be driven by an independent motor, a power transmission mechanism of gears can be removed. In the positive displacement pump or compressor, it is necessary to form a space which changes the volume through the relative movement of two or more rotors, and the two or more rotors are synchronized conventionally by transmission gears, timing gears, or a complicated transmission mechanism using link and cam mechanisms. Although a certain level of high speed is achieved if a lubricating oil is fed to the timing gears or transmission mechanism, the rotating frequency is merely 10000 rpm at the highest, to take the vibration, noise and reliability of the apparatus into consideration. On the other hand, if the present invention is applied to the apparatus, the above-described complicated mechanism is not required, so that the rotors can be rotated not lower than 10000 rpm and the apparatus itself is simplified. Further, dispensing with an oil seal prevents the loss of torque during the mechanical sliding movement and makes it unnecessary to regularly exchange the oil seal and oil.

Since the apparatus embodied by the present invention uses no oil, it realizes a clean vacuum for the semiconductor process. Meanwhile, the power of the vacuum pump is a product of the torque and the rotating frequency. As the rotating frequency is raised, the torque may be smaller. Therefore, the present invention achieves such a secondary effect that the motor can be made small because the torque is decreased owing to the high-speed rotation of the apparatus. Further, the torque necessary for each motor is further reduced owing to the fact that the motor is driven independently for each rotor. For these effects as above, the diameter of the motor is rendered smaller, for example, each rotor is turned to operate linearly by the respective motor as in the above-described embodiment, whereby the apparatus becomes considerably compact, lightweight, and space-saving.

According to the present invention, when the kinetic vacuum pump is provided coaxially with at least one of the rotors by increasing the rotating frequency of motors, a complex broad-band vacuum pump able to draw a vacuum from atmospheric pressure to a high vacuum ($10^{-8}$ torr or lower) is accomplished by one pump.

If the threaded grooves (including screw grooves) are formed in the outer peripheries of the rotors in the positive displacement vacuum pump structure section, in comparison with the Roots type vacuum pump which makes one discharge in one rotation and contains large pulsations in operating fluid, the fluid runs approximately in a continuous flow in the screw pump, making the change of torque impressed to each motor small. Although the torque change disturbs the synchronous rotation of the rotary shafts, the synchronous control is easily achieved with high accuracy at high speeds when the screw groove arrangement is employed which can make the change of torque small. In the screw groove arrangement, since the sucking and discharging sides are sealed therebetween by fitting of many stages of recessed parts and projecting parts, adverse influences resulting from the internal leakage are reduced, and the speed to attain vacuum can be rendered high. Moreover, a cross-section perpendicular to the central rotary axis of each screw type rotor is relatively close to a circle, different from an irregular rotor such as the gear type rotor or the Roots type rotor, and therefore the screw type rotor can be made hollow up to the vicinity of the outer periphery thereof, that is, the internal space can be enlarged. The internal space may be used as a bearing part as in the present embodiment, and the apparatus is hence more compact in structure.

Although the present invention has been fully described in connection with the preferred embodiment thereof with reference to the accompanying drawings, it is to be noted that various changes and modifications are apparent to those skilled in the art. Such changes and modifications are to be understood as being included within the scope of the present invention as defined by the appended claims unless they depart therefrom.

What is claimed is:

1. A synchronous rotating apparatus for synchronously rotating a plurality of rotary shafts independently driven by corresponding driving devices, comprising:
    a mechanical regulating member, arranged on the plurality of rotary shafts, for maintaining relative rotating positions of the plurality of rotary shafts at a predetermined angular difference;
    a rotation velocity and phase-detecting member, arranged on each rotary shaft, for detecting rotation velocities of the rotary shafts and phases within a regulated angular difference of the mechanical regulating member; and
    a driving control device for controlling the driving devices of the rotary shafts to synchronously rotate the rotary shafts based on a phase difference detected by the rotation velocity and phase-detecting member.

2. The synchronous rotating apparatus as claimed in claim 1, further comprising a rotating member respectively affixed to each of said rotary shafts, wherein the mechanical regulating member comprises gears to prevent direct mechanical contact of the rotating members affixed to the rotary shafts.

3. The synchronous rotating apparatus as claimed in claim 1, wherein the rotation velocity and phase-detecting member comprises:
    a rotating plate member having two sides and having detecting slits disposed in such a predetermined pattern that a pitch between adjacent slits is equal to the regulated angular difference of the mechanical regulating member;
    a light source disposed on one of the two sides of the rotating plate member and projecting a light towards the rotating plate member;
    a fixed slit plate member disposed on the other of the two sides of the rotating plate member and having a slit; and
    a light detecting member for detecting the rotation velocities of the rotors and the phases within the regulated angular difference of the mechanical regulating member by receiving the light which has passed through both a detecting slit of the rotating plate member and the slit of the fixed slit plate member, and then outputting a signal to the driving control device in response thereto.

4. The synchronous rotating apparatus as claimed in claim 3, wherein the fixed slit plate member has two slits, and wherein the light detecting member detects light which has passed through a detecting slit of the rotating plate member and one of the slits of the fixed slit plate member, and
    the synchronous rotating apparatus further comprising another light detecting member for detecting light which has passed through slit of the rotating plate member and the other of the slits of the fixed slit plate member.

5. A synchronous rotating apparatus for use with a fluid rotary apparatus;
    the fluid rotary apparatus comprising:
        a plurality of rotors accommodated in a housing;
        bearings for supporting rotation of the rotors;
        suction and discharge fluid ports formed in the housing; and
        motors for rotating and driving the plurality of rotors independently;
    the synchronous rotating apparatus comprising:
        a mechanical regulating member, arranged on the rotors, for maintaining relative rotating positions of the rotors at a predetermined angular difference;
        a rotation velocity and phase-detecting member, arranged on each rotor, for detecting rotation velocities of the rotors and phases within a regulated angular difference of the mechanical regulating member; and
        a driving control device for controlling the motors of the rotors to synchronously rotate the rotors based on a phase difference detected by the rotation velocity and phase-detecting member;
        whereby the fluid is sucked and discharged by utilizing a change of a volume of a space defined by the rotors and the housing through synchronous control of the rotation of the motors by the driving control device.

6. The synchronous rotating apparatus as claimed in claim 5, wherein the mechanical regulating member comprises gears to prevent direct mechanical contact of the rotors.

7. The synchronous rotating apparatus as claimed in claim 5, wherein the rotation velocity and phase-detecting member comprises:
    a rotating plate member having two sides and having detecting slits disposed in such a predetermined pattern that a pitch between the adjacent slits is equal to the regulated angular difference of the mechanical regulating member;

a light source disposed on one of the two sides of the rotating plate, member and projecting a light towards the rotating place member;

a fixed slit plate member disposed on the other of the two sides of the rotating plate member and having a slit; and a light detecting member for detecting the rotation velocities of the rotors and the phases within the regulated angular difference of the mechanical regulating member by receiving the light which has passed through both a detecting slit of the rotating plate member and the slit of the fixed slit plate member, and then outputting a signal to the driving control device in response thereto.

8. The synchronous rotating apparatus as claimed in claim 7, wherein the fixed slit plate member has two slits, the light detecting member detects light which has passed through the slit of a detecting rotating plate member and one of the slits of the fixed slit plate member, and the synchronous rotating apparatus further comprising another light detecting member for detecting light which has passed through said detecting slit of the rotating plate member and the other of the slits of the fixed slit plate member.

9. A synchronous rotating apparatus for synchronously rotating a plurality of rotary shafts independently driven by corresponding driving devices, comprising:

a mechanical regulating means, arranged on the plurality of rotary shafts, for maintaining relative rotating positions of the plurality of rotary shafts at a predetermined angular difference;

a rotation velocity and phase-detecting means, arranged on each rotary shaft, for detecting rotation velocities of the rotary shafts and phases within a regulated angular difference of the mechanical regulating means; and a driving control means for controlling the driving devices of the rotary shafts to synchronously rotate the rotary shafts based on a phase difference detected by the rotation velocity and phase-detecting means.

10. The synchronous rotating apparatus applicable to a fluid rotary apparatus, as claimed in claim 9, wherein the fluid rotary apparatus comprises:

a plurality of rotors arranged on the rotary shafts and accommodated in a housing;

bearings for supporting rotation of the rotors;

suction and discharge fluid parts formed in the housing; and motors for rotating and driving the plurality of rotors independently;

whereby the fluid is sucked and discharged by utilizing a change of a volume of a space defined by the rotors and housing through synchronous control of the rotation of the motors by the driving control means.

* * * * *